April 18, 1961  M. E. LASSER  2,980,763
IMAGE TRANSDUCING SYSTEM
Filed July 2, 1959  3 Sheets-Sheet 1

INVENTOR.
MARVIN E. LASSER
BY
Herbert Epstein
AGENT

INVENTOR.
MARVIN E. LASSER
BY
Herbert Epstein
AGENT

INVENTOR.
MARVIN E. LASSER
BY
Herbert Epstein
AGENT

United States Patent Office 2,980,763
Patented Apr. 18, 1961

2,980,763

IMAGE TRANSDUCING SYSTEM

Marvin E. Lasser, Elkins Park, Pa., assignor to Philco Corporation, Philadelphia, Pa., a corporation of Pennsylvania Filed July 2, 1959, Ser. No. 824,644

20 Claims. (Cl. 178—6.8)

This invention relates to a novel system for producing a signal representative of an electromagnetic image, in particular an infrared image. The invention additionally relates to a system for translating invisible electromagnetic images into visible ones.

Infrared detection systems are finding increasing use in military reconnaissance applications heretofore served by radar because such systems, unlike radar, do not emit a signal which an enemy might detect and because infrared images can be highly resolved by using relatively compact optical systems, whereas relatively large and cumbersome antennas are needed to obtain a high-resolution radar image.

One form of infrared detection system converts the received infrared image into a visible one displayed on the screen of a cathode-ray tube. However to produce such a cathode-ray tube display, it is necessary first to convert the infrared image into a electrical signal representative thereof. Heretofore such conversion of long-wave infrared signals has undesirably resulted in an image-representative electrical signal having a poor signal-to-noise ratio. The ratio is poor because the element of the system which transduces infrared radiation into an electrical signal is generally highly insensitive to long-wave infrared radiation unless it is cooled to a low temperature, and such cooling is not feasible in many infrared detection systems.

More particularly the transducing element typically has been a cathode-ray camera tube having as its image screen a mosaic composed of elements responsive to infrared radiation to change their electrical resistances by an amount dependent on the intensity of infrared radiation incident thereon. The signal produced by the latter type of transducer inherently has a poor signal-to-noise ratio where long wave infrared images are transduced because the mosaic is maintained at a temperature at least equal to room temperature, and may be heated by the electron beam at its point of impingement thereon to a considerably higher temperature. Moreover, because the mosaic is normally sealed within an evacuated container and must have one surface accessible to the infrared radiation and the opposing surface accessible to an electron beam, the mosaic cannot readily be cooled to a low temperature, e.g. that of liquid nitrogen (—196° C.), so as substantially to improve the signal-to-noise ratio of the image-representative signal generated thereby. As a result such infrared detection systems have hitherto been characterized by relatively poor sensitivity and hence their usefulness for military reconnaissance is relatively limited.

Accordingly it is an object of my invention to provide an improved system for producing a signal representative of an electromagnetic image.

Another object is to provide a system which is especially well suited for producing electrical signals representative of infrared images.

Another object is to provide such a system capable of greater sensitivity to long wave infrared images than prior-art systems because its infrared responsive element may be readily cooled to very low temperatures.

Another object is to provide an image-translating system which is simple in structure and reliable in operation.

Another object is to provide an infrared image-translating system which is particularly useful in military reconnaissance activities.

The foregoing objects are achieved by using a system in which an electromagnetic radiation image to be reproduced is formed on a surface of a body of material whose transmissivity for the electromagnetic radiation forming the image is variable, e.g. reducible, at any region thereof in response to impingement of corpusclar particles on said region. These corpuscular particles may be photons, charged particles such as electrons, protons or alpha particles, or uncharged particles such as neutrons. Means are provided for directing a beam of these particles against a surface of the body through which the radiation forming the image must pass and further means are provided for scanning the beam over this surface. As a result of this scansion the transmissivity of different regions of the body is successively altered by the beam. Accordingly the total intensity of radiation from the image transmitted through the scanned surface of the body is continuously varied by an amount dependent on the radiation intensity of that element of the image incident on the body region then being impinged by the beam.

To convert these intensity variations into a signal representative of the scanned image, a detector responsive to the radiation composing the image, e.g. to produce a quantity such as an output voltage or a change in resistance whose value is dependent on the intensity of the incident radiation, is arranged to receive the radiation transmitted through the scanned surface. To provide a visible display of the detected image, e.g. on the screen of a cathode-ray picture tube, the signal developed by the detector may be utilized to intensity-modulate the beam of the picture tube, which beam is scanned in coordination with the scansion of the surface of said body by the beam of corpuscular particles.

Since the detector is only required to respond to variations in the total amount of image radiation transmitted through the body, it may be physically separated from the scanned body and the apparatus for scanning it. When so separated, the detector may be readily cooled to extremely low temperatures by the use of simple cooling means. As a result of such cooling the signal-to-noise ratio of the image-representative signal generated by the detector is considerably improved over that of prior-art systems.

Where the image to be detected consists of infrared radiation, the scanned body preferably is composed of a semiconductive material, e.g. silicon, germanium, gallium arsenide, indium arsenide, indium antimonide, indium phosphide or gallium phosphide, whose transmissivity for infrared radiation over any region thereof is substantially diminished in response to impingement of the corpuscular beam on said region.

The invention will be understood more fully from a consideration of the following description taken in connection with the accompanying drawings in which.

Figures 1, 3:
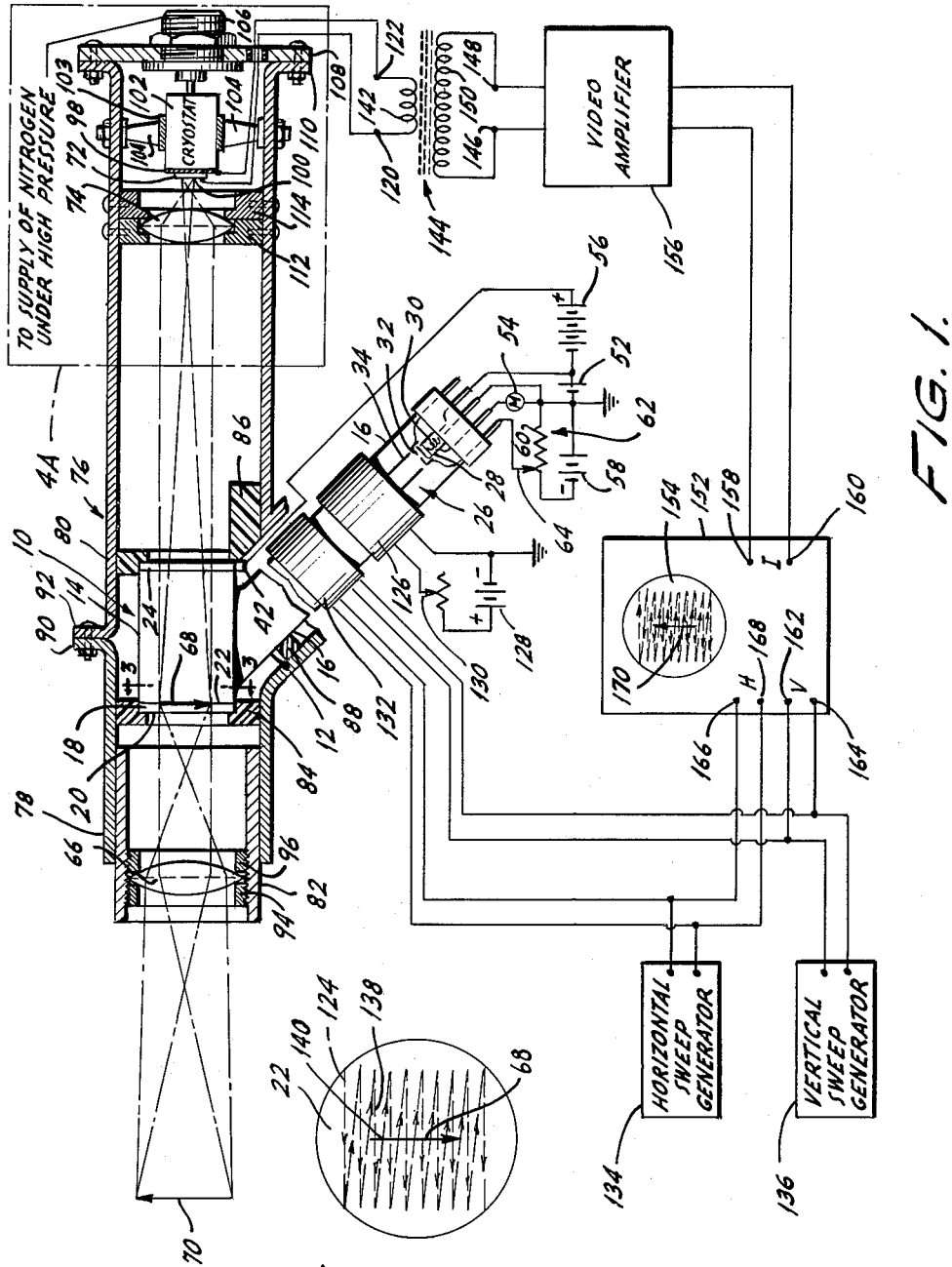
Figure 1 is a schematic diagram of an image-translating system according to the invention.
Figure 3 is a view of the scanned body of the system of Figure 1.
Figure 2:
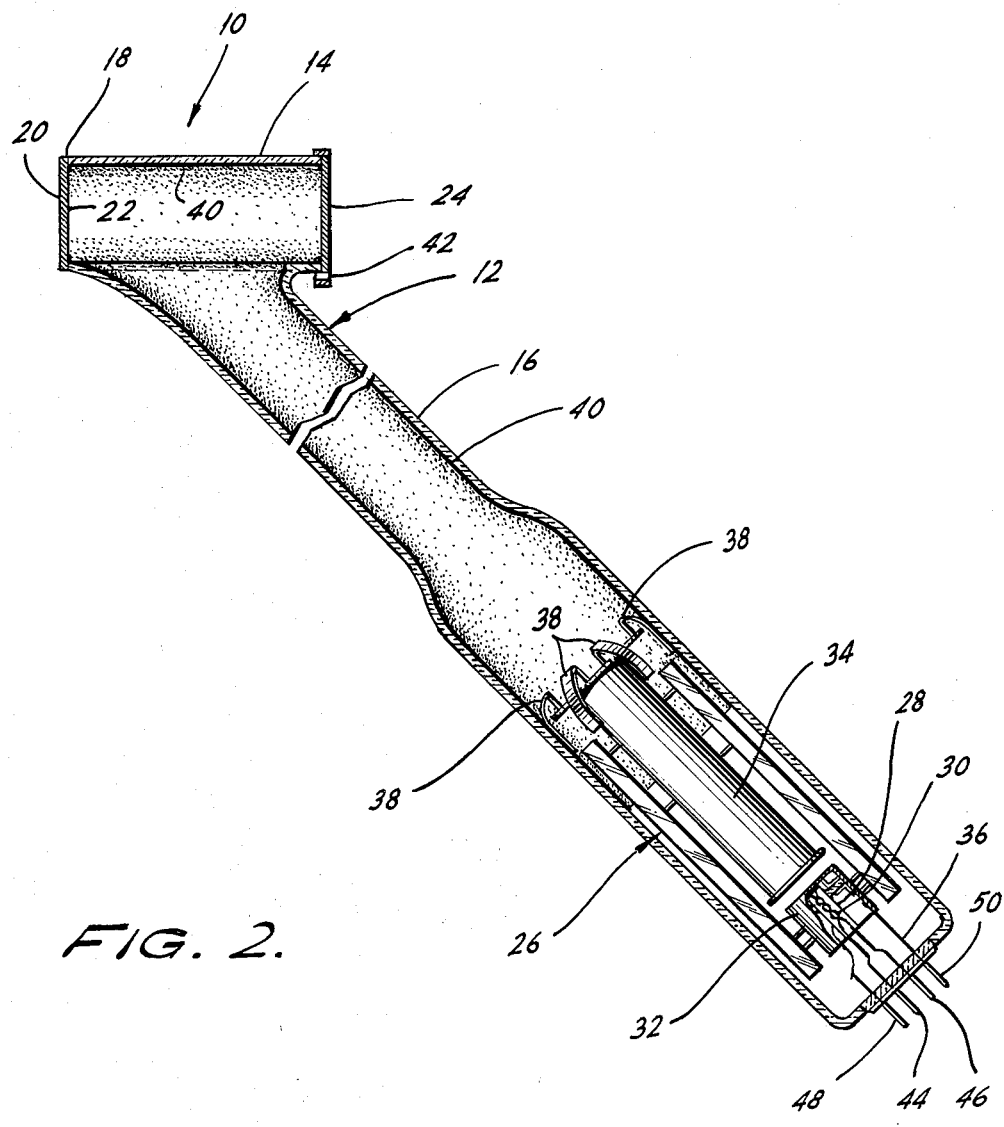
Figure 2 is a cross-sectional view of an image-dissecting tube according to the invention.

An image-translating system according to the invention, which is particularly useful for generating an electrical signal representative of infrared information, is shown in Figure 1. This apparatus includes a tube 10, shown schematically in Figure 1 and in cross-sectional view in Figure 2. As shown by these figures, tube 10 comprises an evacuated glass envelope 12 having a cylindrical portion 14 and a neck 16. A thin disk 18 composed of semiconductive, monocrystalline silicon and having substantially plane and parallel surfaces 20 and 22 is sealed onto one end of cylindrical portion 14, and an infrared-transmissive window 24, which may also be composed of monocrystalline silicon, is sealed onto the other end of portion 14. In addition an electron gun 26 is positioned within neck 16 in an orientation such that in operation it projects against surface 22 an electron beam scannable thereover.

More particularly gun 26 comprises a cathode 28, a heater 30 therefor, a control electrode 32 and an anode 34. Gun 26 is supported within neck 16 by stiff lead wires, e.g. wire 36, secured to control electrode 32 and to prongs in the base of tube 10. It is also supported by metal spring fingers 38 integral with anode 26 and constructed so as to press against the interior surface of neck 16. To complete the electron optics of tube 10, a conductive coating 40, e.g. of aquadag, is applied to the entire interior surface of cylindrical portion 14, a narrow peripheral portion of disk 22 and window 24 adjoining cylinder 14 and a portion of the interior surface of neck 16 extending below the region thereof contacted by fingers 38. Electrical connection to aquadag layer 40 and anode 34 is provided by a spring clip 42 surrounding silicon window 24. In addition prongs 44 and 46 respectively provide electrical connections to heater 30, prong 48 provides electrical connection to cathode 28 and prong 50 provides electrical connection to control electrode 24.

As shown in Figure 1 a battery 52 energizes heater 30. Cathode 28 is connected to a point at reference potential by way of a milliammeter 54, and a battery 56 supplies a positive voltage to anode 34 and coating 40. Typically this anode voltage is between about 10 and 30 kilovolts although it may be as high as 140 kilovolts. In addition the intensity of the beam current of the tube is controlled by applying to control electrode 32 a potential negative with respect to that of the cathode 28. This potential is supplied by a battery 58 shunted by the resistance element 60 of a potentiometer 62. The positive terminal of battery 58 is connected to cathode 28 and the movable arm 64 of potentiometer 62 is connected to control electrode 32.

In addition to tube 10 and its associated power supply, the system of the invention comprises a lens 66, typically composed of arsenic trisulfide, for forming on surface 22 of silicon disk 18 an image 68 of a source 70 of infrared radiation, an infrared detector 72, and a second lens 74 for directing onto detector 72 infrared radiation transmitted through surface 22. Moreover the system comprises means for focusing the electron beam generated in tube 10 by gun 26 onto surface 22 of disk 18 and for scanning this beam thereover.

All of the foregoing elements are mounted within a telescope assembly 76 which comprises two metal tube sections 78 and 80 and a third tube 82 fitting slidably within tube 78. More particularly cylindrical portion 14 of tube 10 is rigidly mounted between insulating supports 84 and 86 respectively secured to tube sections 78 and 80. The latter sections are shaped to accommodate neck 16 of tube 10 and to support it, e.g. by an insulating spacer 88, and have flanges 90 and 92 at which they are bolted together after tube 10 is inserted therein. Lens 66 is supported within tube 82 by rings 94 and 96. Because tube 82 is slidable within section 78 the distance of lens 66 from disk 18 can be varied in accordance with variations in the distance of source 70 from lens 66 so as to focus sharply image 68 of the source on disk surface 22.

Detector 72 comprises a crystal of indium antimonide soldered to a metal member 98 and having an exposed surface 100. The latter crystal, which has a p-n junction formed in a surface immediately adjacent surface 100, is responsive to infrared radiation incident thereon to generate between surface 100 and the surface soldered to member 98 a voltage whose amplitude is proportional to the intensity of this incident radiation. In order to improve the signal-to-noise ratio of the voltage generated by crystal 72 in response to the incident infrared radiation, the crystal preferably is cooled to a very low temperature, e.g. of the order of that of liquid nitrogen ($-196°$ C.). To achieve this cooling a cryostat 102 for generating liquid nitrogen is positioned adjacent metal member in an appropriate supporting member which is held in a fixed position within tube section 80 by a clamp 103 and radial members 104 affixed thereto and to section 80. To produce liquid nitrogen adjoining metal member 98, nitrogen gas under high pressure is supplied to cryostat 102 via a high-pressure coupling 106. This coupling is mounted on a back plate 108 bolted to a flange 110 of tube section 80. The structures of a specific indium antimonide cell and its cryostat are discussed in detail hereinafter with reference to Figure 4.

Lens 74 is mounted within tube section 80 in a fixed position between crystal 72 and tube 10 by metal rings 112 and 114 secured to tube section 80. The position and focal length of lens 74 are such that it concentrates infrared radiation incident on surface 22 of disk 18 onto surface 100 of crystal 72, i.e. so as to form thereon a real image of image 68. Because smaller indium antimonide crystals generate less noise than larger ones it is preferred that lens 74 have a short focal length so as to demagnify greatly image 68 and hence permit it to be focussed in its entirety onto a small crystal.

When the image of image 68 is focussed thereon, crystal 72 produces across its terminals 120 and 122 an output voltage proportional to the total intensity of the infrared radiation contained in image 68. However this voltage of itself provides no information concerning the specific configuration of source 70. To provide this information the electron beam generated by gun 26 is scanned across surface 22 of disk 18 in a manner so as to form a raster. This raster is diagrammatically illustrated at 124 in Figure 3. Such a raster may be formed in conventional fashion by focussing the electron beam on surface 22 by means of a conventional focussing coil 126 energized by a battery 128 connected to coil 126 by a rheostat 130, and by deflecting the beam appropriately by means of a deflection coil 132 whose horizontal- and vertical-deflection windings are respectively energized by horizontal and vertical sweep generators 134 and 136 of conventional structure.

As the electron beam traces the raster, it renders the instantaneously impinged region of disk 18 substantially opaque to any infrared radiation incident thereon. Where no infrared radiation is incident on the region then being impinged by the beam, e.g. region 138, no change occurs in the total intensity of infrared radiation focussed on crystal 72. As a result no change occurs in the output voltage produced by crystal 72 across terminals 120 and 122. By contrast, where infrared radiation is incident on the impinged region, e.g. region 140, the beam, by rendering this region substantially opaque to infrared radiation, reduces the total intensity of infrared radiation incident on crystal 72 by an amount equal to the intensity of infrared radiation obscured by the beam. As a result the output voltage of crystal 72 decreases in proportion to this reduction in total intensity. Thus the system produces across terminals 120, 122 a unidirectional voltage having amplitude variations representative of the configuration of the infrared image 68 focussed on disk 18.

To derive the amplitude-varying, image-representative component of this voltage as well as to amplify it, the primary winding 142 of a step-up transformer 144 is connected to terminals 120 and 122 of crystal 72. The voltage component, amplified, then appears across terminals 146 and 148 of the secondary winding 150 of this transformer. Preferably transformer 144 is of a type which can transmit voltages having frequencies within a wide band, e.g. 150 cycles per second to 5 megacycles per second, without substantial discrimination therebetween.

The image-representative voltage so obtained can be used to produce a visible image of the invisible infrared source. One simple way of doing this is illustrated in Figure 1. In this arrangement the image-reproducing device is a conventional cathode-ray oscilloscope 152 comprising a cathode-ray tube having a screen 154. The cathode-ray beam of oscilloscope 152 is intensity-modulated in conventional manner by applying the image-representative voltage, preferably after amplification by a video amplifier 156 of appropriate bandwidth and gain, to the intensity-modulation terminals 158 and 160 of oscilloscope 152. In addition its cathode-ray beam is scanned across screen 154 in coordination with the scansion of the electron beam of tube 10. This is most easily accomplished by supplying the output signal of vertical sweep generator 136 to the vertical deflection terminals 162 and 164 of oscilloscope 152 and by supplying the output signal of horizontal sweep generator 134 to the horizontal deflection terminals 166 and 168 of oscilloscope 152. In order to reinvert the inverted real image 68 formed on disk 18, the output signals of sweep generators 134 and 136 are respectively applied to these terminals in senses opposite those in which they are applied to the horizontal and vertical deflection windings of deflection coil 132. Alternatively the inversion of the image may be achieved in well-known manner by appropriately positioning a second convex lens (not shown) between source 70 and disk 18. Where this additional lens is used the aforementioned sweep signals are applied in the same senses to oscilloscope 152 and coil 132. Under either of these conditions an erect, visible image 170 of invisible, infrared source 70 is formed on screen 154 of oscilloscope 152.

Figure 4:
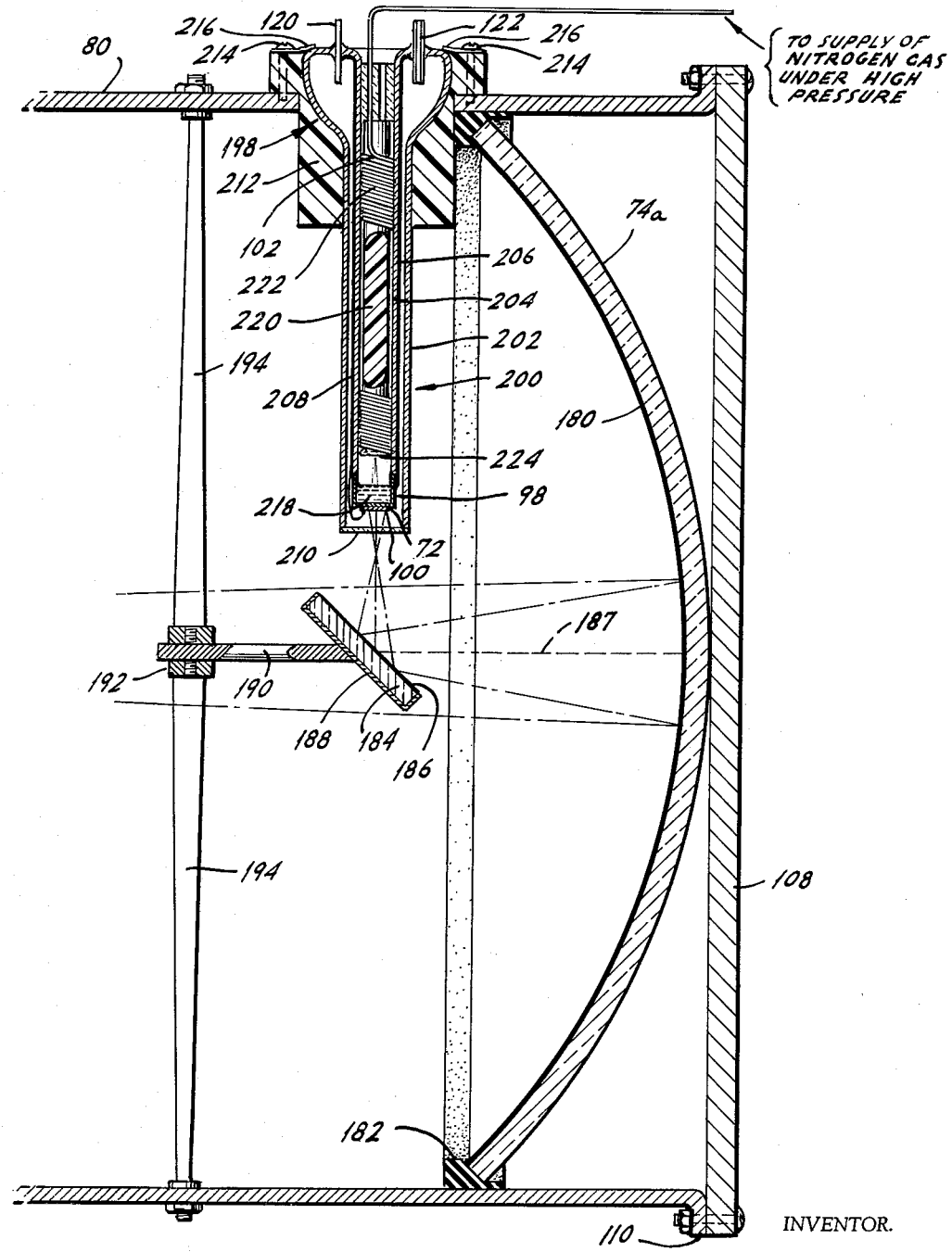
Figure 4 is a cross-sectional view of apparatus usable in the system of Figure 1.

The specific structure of the system of the invention can be varied in many ways. For example, the optical arrangement used to focus the image of image 68 onto surface 100 of crystal 72 need not comprise a lens 74 but instead may comprise one or more mirrors. In this regard Figure 4 shows an enlarged view of an optical arrangement utilizing two mirrors which may be substituted in the system of Figure 1 for the arrangement enclosed therein by box 4A. In the arrangement of Figure 4 lens 74 is replaced by a concave spherical mirror 74a the front surface 180 of which is appropriately silvered or aluminized and which is positioned coaxially with disk 18 of tube 10. Preferably mirror 74a has a large aperture so as to obtain efficient collection of the infrared radiation of image 68, and has a short focal length so as to obtain appropriate demagnification of this image. The latter mirror is supported within tube section 80 by a fitting 182 secured to section 80 and by back plate 108. To direct the real image formed by mirror 78a onto surface 100 of indium antimonide crystal 72, which in the arrangement of Figure 4 is oriented horizontally, a plane mirror 184 aluminized or silvered on its front surface 186 is positioned at an angle of 45° with respect to the principal axis 187 of spherical mirror 74a. Mirror 184 is rigidly supported within tube section 80 by a holder 188 having a rod 190 secured to section 80 by a collar 192 and radial members 194.

The assembly 198 supporting crystal 72 comprises a glass vessel 200 having an exterior cylindrical portion 202 and an interior re-entrant cylindrical portion 204 which is somewhat shorter than exterior portion 202. A metal cup 98, which typically is composed of a Kovar alloy, is sealed onto the end of re-entrant portion 204.

The surface of crystal 72 opposite its surface 100 is soldered to the base of metal cup 98. Electrical connection is afforded to the soldered surface of crystal 72 by a conductor 206, e.g. a platinum ribbon secured to cup 98 and a terminal 122, while electrical connection is afforded to surface 100 of crystal 72 by a second platinum ribbon 208 soldered thereto and secured to a second terminal 120. To protect crystal 72 from noxious atmospheric contaminants while permitting infrared radiation freely to fall upon its surface 100, an infrared transmissive window 210, composed for example of sapphire, is sealed onto the end of external cylinder 202. In addition, to support assembly 198 within tube section 30, a sleeve 212 secured to section 30 by screws 214, and spring clips 216 bearing on assembly 198, are provided.

In operating this indium antimonide cell a body of liquid nitrogen 218 is produced and replenished within metal cup 98 by cryostat 102. In the form shown cryostat 102 comprises a plastic cylindrical mandrel 220 upon which is wound a coil 222 of metal tubing of very small diameter, e.g. steel tubing of the type used to fabricate hypodermic needles. Typically this tubing has a diameter of 0.010 inch and the diameter of the mandrel is such that the tubing fits snugly within re-entrant portion 204. The tubing of coil 222 is pinched off and secured to mandrel 220 at the end thereof adjacent cup 98 and a very small orifice 224, e.g. 0.002 inch in diameter, is made in the tubing at a region thereof facing cup 98. Nitrogen gas at room temperature and under high pressure, e.g. 1500 pounds per square inch, is supplied to the other end of coil 222. Typically this gas emerges from orifice 224 under a pressure of about 900 pounds per square inch, its pressure falling immediately outside the orifice to about atmospheric pressure. As a result of this large drop in its pressure and consequent expansion, the nitrogen gas emerging from orifice 224 chills to the temperature of liquid nitrogen. This chilling is aided by the circulation of highly cooled nitrogen gas over coil 222, which cools the gas therewithin approaching orifice 224.

The body 218 of liquid nitrogen thus produced within Kovar cup 98 maintains crystal 72 at a temperature of approximately −196° C. As a result the sensitivity of the system particularly to long wave infrared radiation is considerably greater than that obtainable from systems wherein the infrared detector must operate at room temperatures.

The structure of tube 10 is susceptible of numerous variations. For example disk 18 and window 24 may be composed of semiconductors other than monocrystalline silicon, e.g. germanium, gallium arsenide, indium arsenide, indium antimonide, indium phosphide or gallium phosphide. The semiconductor of which the disk and window are respectively composed may be polycrystalline in form, e.g. they may be composed of cast silicon. Because each semiconductor transmits a band of radiant energy which differs somewhat from the transmission bands of other semiconductors, care should be taken that detector 72 is one responsive to the band of radiation transmitted by disk 18 and window 24.

The specific electron-beam focussing and deflection system shown in Figure 1 may be replaced by other conventional focussing and deflection systems, e.g. electrostatic focussing and deflection systems or systems which are partly electrostatic and partly electromagnetic.

Electron gun 26 of tube 10 may be replaced by means generating corpuscular particles, other than electrons, having energy sufficient to vary the transmissivity for infrared radiation of disk 18 upon impingement thereon. These other corpuscular particles may be charged particles, such as alpha particles or protons, uncharged particles such as neutrons, or photons having energies in excess of the gap energy of the semiconductor, e.g. ultraviolet light. Thus a collimated, small-diameter beam of ultraviolet light may be scanned across the surface of a semiconductive body in a manner such as to trace a raster thereon, e.g. by causing the beam to impinge on an appropriately positioned plane mirror which is vibrated simultaneously at two appropriate frequencies about each of two mutually perpendicular axes coplanar with the mirror. Because such scanning systems are well known no further discussion herein is deemed necessary.

Portion 14 of tube 10 need not be cylindrical. For example it may flare outwardly from disk 18, in the form of a truncated cone or a paraboloid of revolution, so as to permit more efficient collection of infrared radiation onto detector 72 from the peripheral portions of disk 18. Furthermore window 24 may be replaced by a lens (not shown) composed of an infrared transmissive material, e.g. arsenic trisulfide, and having a focal length such as to focus the infrared radiation incident on surface 22 of disk 18 onto infrared detector 72. In such a case lens 74 may be eliminated.

While the image-translating system specifically shown in Figure 1 is especially well suited for the generation of an electrical signal representative of an infrared image, it will be apparent that systems according to my invention are capable of generating an electrical signal representative of an image composed of other electromagnetic radiations. To achieve this result it is only necessary that disk 18 be replaced by a body whose transparency to the particular radiation of which the image is composed is substantially alterable by impingement thereof by a beam of corpuscular particles, that detector 72 be responsive to said particular radiation to produce an electrical quantity dependent on the intensity thereof, and that lenses 66 and 74 or mirrors 74a and 184 (see Figure 4) be replaced by optics capable of focusing the radiation.

In addition, although the system of Figure 1 has been shown in the form of a simple closed-circuit, image-reproducing arrangement, it is clear that the image-information signal generated by detector 72 may be applied as a modulating signal to the input of a television transmitter and broadcast thereby.

Moreover the system of Figure 1 can readily be adapted to measure the temperature of a remote infrared source or a portion thereof. This measurement is possible because, when the beam current of tube 10 is below a given intensity, the percentage of incident infrared radiation transmitted through the portion of surface 22 impinged by the beam varies inversely as the intensity of the beam. Moreover for each beam intensity this percentage varies as a function of the wavelength of the infrared radiation and therefore as a function of the temperature of its source. Accordingly the temperature of a remote infrared source can be measured by determining the amount by which the intensity of the beam current of tube 10 must be decreased from said given intensity to increase by a fixed percentage the transmissivity of disk 18 for the infrared radiation incident thereon.

More particularly the system of Figure 1 can be modified in the following manner to adapt it to measure the temperature of a portion of a remote infrared source. Vertical sweep generator 136 is disconnected from terminals 162, 164 of oscilloscope 152 as well as from deflection coil 132. In place of generator 136 a source of constant current (not shown) is connected to the vertical deflection coils of coil 132, thereby to deflect the electron beam of tube 10 to the vertical level of image 68 corresponding to the portion of source 70 whose temperature is to be measured. In addition the connection between terminals 158, 160 of oscilloscope 152 and the output of video amplifier 156 is broken, and this output is connected instead to vertical deflection terminals 162, 164.

To measure the temperature of that portion of image 68 across which the beam of tube 10 sweeps (and hence the temperature of the region of source 70 corresponding to this portion) the intensity of the electron beam is first adjusted to said given intensity by use of potentiometer 62 and millimmeter 54. Next the height of a vertically-oriented pulse (not shown) produced on screen 154 of oscilloscope 152 in response to the sweeping of said portion of image 68 by the beam of tube 10 is measured. This pulse height corresponds to the change in transmissivity of disk 18 for the infrared radiation incident thereon along the line swept by the electron beam. Then the beam current of tube 10 is decreased by the amount required to reduce the height of the pulse by a fixed percentage and this final beam current is read on meter 54. The difference between the initial and final beam currents is a measure of the temperature of the remote source. To ascertain the value of this temperature the system is calibrated by using as source a black-body radiator heated successively to different known temperatures, and by determining for each temperature the amount by which the beam current of tube 10 must be decreased from said given intensity to reduce by said fixed percentage the height of the vertical pulse produced on oscilloscope screen 154 in response to the infrared radiation of the black-body radiator.

While I have described my invention by means of specific examples and in specific embodiments, I do not wish to be limited thereto, for obvious modifications will occur to those skilled in the art without departing from the scope of the invention.

What I claim is:

1. In combination: a body of material whose transmissivity for electromagnetic radiation at any region thereof is variable in response to impingement of corpuscular particles on said region, means for focusing electromagnetic radiation onto a surface of said body to form an image on said surface, means for scanning a beam of corpuscular particles over said body to vary its transmissivity successsively at different regions thereof, said beam being substantially free of image-representative modulation, and means responsive to electromagnetic radiation and disposed to receive electromagnetic radiation transmitted through said body.

2. In combination: a body composed of a substance whose transmissivity for electromagnetic radiation at any region thereof is variable in response to impingement by corpuscular particles; means for focusing electromagnetic radiation onto a surface of said body to form an image on said surface; means for scanning a beam of said particles over said surface to vary the transmissivity of said body successively at different regions thereof, said beam being substantially free of image-representative modulation; and means responsive to electromagnetic radiation and disposed to receive electromagnetic radiation transmitted through said surface.

3. Apparatus according to claim 2 wherein said radiation-responsive means includes means for producing an electrical quantity having a value dependent on the intensity of said received electromagnetic radiation.

4. Apparatus according to claim 2 wherein said body is composed of a semiconductor whose transmissivity for infrared radiation at any region thereof is variable in response to impingement thereon by said corpuscular particles, and wherein said means responsive to electromagnetic radiation comprise means responsive to infrared radiation.

5. Apparatus according to claim 4 wherein said semiconductor is one chosen from the group consisting of silicon, germanium, gallium arsenide, indium arsenide, indium antimonide, indium phosphide and gallium phosphide.

6. Apparatus according to claim 4 wherein said corpuscular particles are charged particles.

7. Apparatus according to claim 4 wherein said semiconductor is silicon and said corpuscular particles are electrons.

8. Apparatus according to claim 4 wherein said radiation-responsive means include means for producing an electrical quantity having a value dependent on the intensity of said received infrared radiation.

9. Apparatus according to claim 4 wherein said semiconductive body has a pair of substantially parallel surfaces separated by a distance small compared to the smallest transverse dimension of either of the last-named surfaces, and wherein one of the last-named surfaces is said scanned surface.

10. Apparatus according to claim 4, said apparatus additionally comprising means for cooling said infrared-radiation responsive means.

11. Apparatus according to claim 4 wherein said radiation-responsive means comprise a crystal of indium antimonide.

12. An image-translating system comprising wave-generating apparatus including a body of material whose transmissivity for electromagnetic radiation at any region thereof is variable in response to impingement of corpuscular particles on said region, means for focusing electromagnetic radiation onto a surface of said body to form an image on said surface, means for scanning a beam of corpuscular particles over said body to vary its transmissivity successively at different regions thereof, and said beam being substantially free of image-representative modulation, means arranged to receive electromagnetic radiation transmited through said body and responsive to the last-named radiation to generate a wave representative of said electromagnetic radiation image; and image-display apparatus responsive to an image-information signal to produce on successive elements of a screen light whose instantaneous intensity is dependent on said image-information signal, means for supplying said wave to said display apparatus as an image-information signal, and means for coordinating the production of said light on said screen with said scansion of said corpuscular beam over said body.

13. A system according to claim 12 wherein said image-display apparatus comprises a cathode-ray tube, wherein said coordinating means comprise means for scanning the cathode-ray beam of said tube over its screen in coordination with said scansion of said corpuscular beam, and wherein said system additionally comprises means coupled to said wave-supplying means and responsive to said wave to vary the intensity of said cathode-ray beam.

14. In combination: a body, means for focusing electromagnetic radiation onto a surface of said body to form an image on said surface, means responsive to electromagnetic radiation and arranged to receive radiation from said surface, said body being composed of a material responsive to impingement of corpuscular particles on any region of said surface to control the amount of said image radiation received from said region by said radiation-responsive means, and means for scanning a beam of corpuscular particles over said surface to control the amount of said image radiation received from successive regions thereof by said radiation-responsive means, said beam being substantially free of image-representative modulation.

15. Apparatus according to claim 14 wherein said material is a semiconductor.

16. An image-translating system comprising wave-generating apparatus including a body, means for focusing electromagnetic radiation onto a surface of said body to form an image on said surface, means arranged to receive radiation from said surface and responsive to said received radiation to generate a wave indicative of its intensity, said body being composed of a material responsive to impingement of corpuscular particles on any region of said surface to control the amount of said image radiation received from said region by said radiation-responsive means, and means for scanning a beam of corpuscular particles over said surface to control the amount of said image radiation received from successive regions thereof by said radiation-responsive means, said beam being substantially free of image-representative modulation; and image-display apparatus responsive to an image-information signal to produce on successive elements of a screen light whose instantaneous intensity is dependent on said image-information signal, means for supplying said wave to said display apparatus as an image-information signal, and means for coordinating the production of said light on said screen with said scansion of said corpuscular beam over said body.

17. Apparatus according to claim 16 wherein said material is a semiconductor.

18. A combination according to claim 2, wherein said beam has a substantially constant intensity.

19. An image-translating system according to claim 12, wherein said beam has a substantially constant intensity.

20. An image-translating system according to claim 16, wherein said beam has a substantially constant intensity.

References Cited in the file of this patent
UNITED STATES PATENTS
2,563,472    Leverenz _____ Aug. 7, 1951

OTHER REFERENCES

Attenuated Superconductors, by D. H. Andrews et al., Review of Scientific Instruments, volume 13, July 1942.